United States Patent [19]

Stupak, Jr.

[11] Patent Number: 4,659,969

[45] Date of Patent: Apr. 21, 1987

[54] VARIABLE RELUCTANCE ACTUATOR HAVING POSITION SENSING AND CONTROL

[75] Inventor: Joseph J. Stupak, Jr., Portland, Oreg.

[73] Assignee: Synektron Corporation, Portland, Oreg.

[21] Appl. No.: 639,187

[22] Filed: Aug. 9, 1984

[51] Int. Cl.⁴ .............................................. H02K 33/00

[52] U.S. Cl. .................................... 318/128; 361/154; 310/30

[58] Field of Search .................. 310/30; 318/114, 128, 318/132; 361/154

[56] References Cited

U.S. PATENT DOCUMENTS

| | | | |
|---|---|---|---|
| 2,785,356 | 3/1957 | Nisle | 318/128 |
| 2,906,945 | 9/1959 | Weiss . | |
| 3,293,516 | 12/1966 | Maier et al. . | |
| 3,584,496 | 6/1971 | Keller . | |
| 3,671,814 | 6/1972 | Dick | 361/154 |
| 3,697,837 | 10/1972 | Umbaugh | 310/30 X |
| 3,855,529 | 12/1974 | Langweiller . | |
| 3,857,081 | 12/1974 | Gebelein . | |
| 3,932,792 | 1/1976 | Massie . | |
| 4,079,436 | 3/1978 | Brown . | |
| 4,080,552 | 3/1978 | Brown . | |
| 4,086,518 | 4/1978 | Wilkinson . | |
| 4,319,236 | 3/1982 | Brace et al. . | |
| 4,343,597 | 8/1982 | Brown . | |
| 4,368,501 | 1/1983 | Gingrich . | |
| 4,434,450 | 2/1984 | Gareis . | |
| 4,450,427 | 5/1984 | Gareis . | |

FOREIGN PATENT DOCUMENTS

| | | | |
|---|---|---|---|
| 54/12028 | 8/1980 | Japan . | |

*Primary Examiner*—Donovan F. Duggan
*Attorney, Agent, or Firm*—Chernoff, Vilhauer, McClung & Stenzel

[57] ABSTRACT

A controlled force variable reluctance actuator. A variable reluctance actuator having a moving element operated by a solenoid is provided in which the current in the solenoid is controlled by a signal representative of the flux density in the magnetic circuit of the actuator. The signal is produced by a Hall effect device placed in the magnetic circuit. Preferably, the Hall effect device controls the current in the solenoid by controlling its duty cycle; however, continuous control of the current may also be employed. Alternative embodiments are provided for a constant force actuator, an actuator whose force-displacement characteristic is altered, and an actuator in which the force may be selectively controlled. An embodiment is also provided for selectively controlling the position of the moving element based upon measured electric and magnetic parameters of the actuator.

6 Claims, 11 Drawing Figures

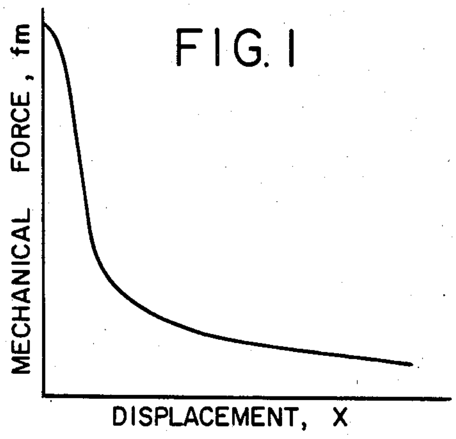
FIG. 1
FIG. 3
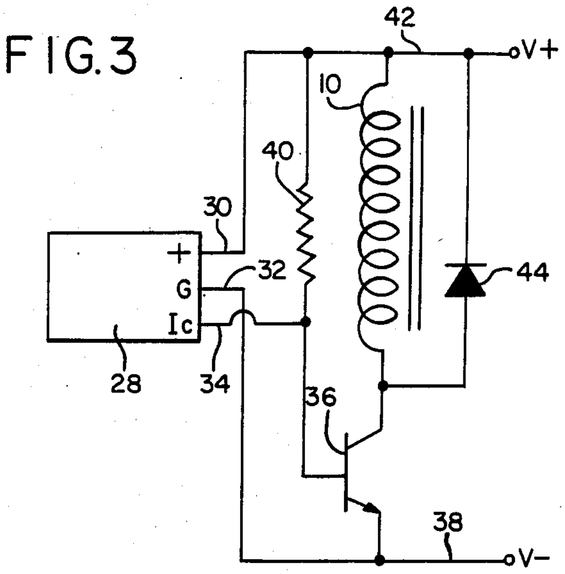
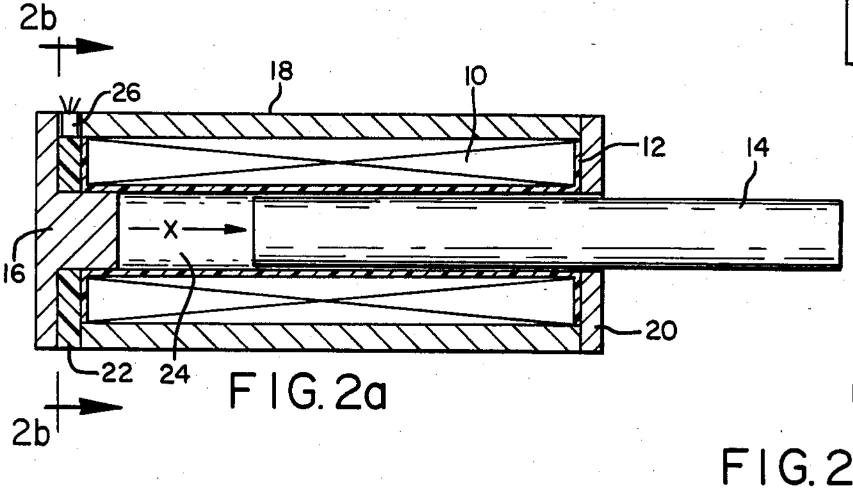
FIG. 2a
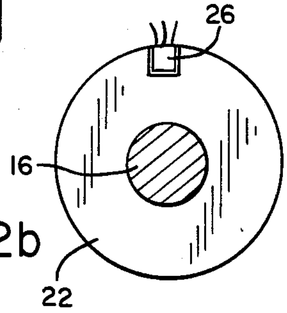
FIG. 2b
FIG. 5a
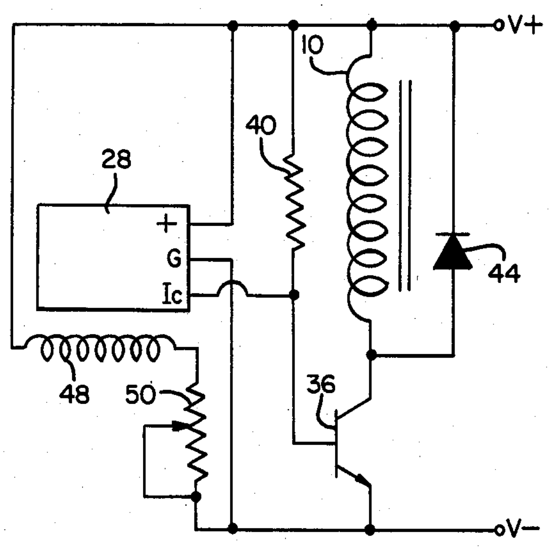
FIG. 5c
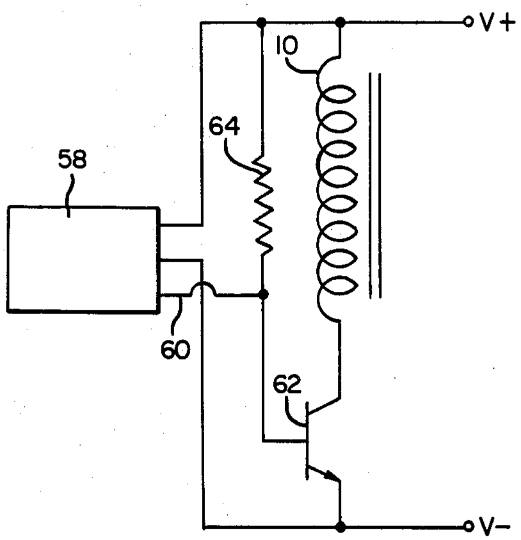

VARIABLE RELUCTANCE ACTUATOR HAVING POSITION SENSING AND CONTROL

BACKGROUND OF THE INVENTION

This invention relates to variable reluctance actuators, particularly variable reluctance actuators whose mechanical force may be controlled throughout the range of movement of their movable actuation element.

Variable reluctance actuators operate on the principle that a magnetic material, when placed in a magnetic field, will experience a mechanical force tending to move the material in a direction parallel to the field, the mechanical force at any point on the surface of the material being proportional to the square of the flux density of the magnetic field experienced at that point. A magnetic material is a material that exhibits enhanced magnetization when placed in a magnetic field.

In a practical variable reluctance actuator a movable element made of magnetic material, typically in the form of a ferromagnetic plunger, is subjected to a magnetic field generated by an electrical current in a coil so that it transmits the resultant force to some other device for actuation. Such an actuator is referred to as a "variable reluctance" actuator because as the movable element, which makes up part of a magnetic circuit, moves in response to mechanical force, it varies the reluctance within the magnetic circuit, ordinarily by changing the dimension of an air gap.

A typical example of a variable reluctance actuator is a linear actuator comprising a plunger mounted for sliding inside the core of a solenoid. (Although the term "solenoid" is loosely used commonly to refer to such a device as a whole, it is used herein in its technical sense to refer to a coil comprising one or more layers of windings of an electrical conductor ordinarily wound as a helix with a small pitch.) Such linear actuators are used, for example, in vehicles, household appliances, and a variety of industrial applications, such as for controlling valves.

Variable reluctance actuators are to be distinguished from actuators in which mechanical force is created as a result of current passing through a conductor oriented perpendicular to a magnetic field, thereby creating lateral force on the conductor, the conductor typically being wound in the form of a movable solenoid. In general, the latter are more difficult to construct and provide less actuation force per unit volume.

A principal problem with variable reluctance actuators which limits the applications to which they may be put is that the mechanical force experienced by the moving element in the actuator changes as a function of the position of the moving element. Ordinarily the change is non-linear, the force increasing more rapidly as the effective air gap in the device decreases, since the decrease in air gap produces a decrease in circuit reluctance and a concomitant increase in circuit flux. This generally causes the moving element to release energy in the form of undesirable vibration and noise when it collides with a stop for limiting its excursion, and makes controlled positioning of the element difficult. While the force can theoretically be controlled by controlling the current in the solenoid this has heretofore been difficult to accomplish effectively. Consequently, such devices are ordinarily used in simple on-off applications where the vibration and noise resulting from collision of the moving element with a stop is of little or no significance, and are often relatively crude devices.

Previous approaches to controlling the mechanical force created by variable reluctance actuators so as to employ them in more sophisticated applications have employed transducers to measure the mechanical force or the position of the moving element to provide feedback for controlling the current in a solenoid. One example of such an approach is shown by Keller U.S. Pat. No. 3,584,496 wherein a force-sensitive transducer is employed to measure the mechanical force applied by the moving element of a variable reluctance actuator and the output of the transducer is employed to control the current in the solenoid of the actuator. In Umbaugh U.S. Pat. No. 3,697,837, the position of the moving element is also detected by a displacement-sensitive transducer to control the current in a solenoid and, hence, the position of the moving element.

Some drawbacks of measuring the actual mechanical force experienced by the moving element, which requires a device sensitive to change in physical dimensions, such as a strain gauge, are that such devices are typically sensitive to orientation, inertia, and shock, have slow response times, and require complex circuits to control the current in the magnetic field generating coil. While devices for measurement of the position of the moving element can be more readily employed to adjust the position of the moving element, they are subject to some of the same problems. Moreover, they cannot be used to adjust the mechanical force without knowledge of, and compensation for, the force-position characteristic of the actuator.

Since the force experienced by the moving element of a variable reluctance actuator is proportional to the square of the magnetic flux density experienced by the element, it would be desirable to measure that magnetic flux density directly. Although coils have been used to detect a change in magnetic field strength in bi-stable variable reluctance actuators, as in Massie U.S. Pat. No. 3,932,792, a coil cannot be used to measure the instantaneous magnitude of magnetic field strength, or flux density. An alternative would be to use a Hall effect device, whose output is a function of the magnetic flux density that it experiences. While Hall effect devices have been used in connection with permanent magnets as position detectors, as in Brace et al., U.S. Pat. No. 4,319,236, it is believed that they have not been used to measure the flux density experienced by a moving element in a variable reluctance actuator.

It would also be desirable to control the flux density in the moving element of a variable reluctance actuator by controlling the duty cycle of the solenoid in order to maximize energy efficiency. Electronic circuits for switching the current in a solenoid on and off in a varible reluctance actuator, including a flyback diode for protecting the circuitry from unacceptable voltage excursions during the collapse of the magnetic field in the solenoid, have been used, for example, in electronically driven pumps, as shown in Maier et al., U.S. Pat. No. 3,293,516; however, such devices are bistable, and do not control the current in the solenoid to maintain substantially constant flux density in the moving element.

In addition, it would be desirable to control the position of the moving element of a variable reluctance actuator based upon the magnetic and electrical characteristics of the actuator itself, rather than an external transducer subject to difficult-to-control variables.

SUMMARY OF THE INVENTION

The present invention provides a variable reluctance actuator whose force and position can be effectively and simply controlled. It avoids the problems of external transducers subject to uncontrollable variables by directly measuring the ultimate quantity that determines the mechanical force experienced by the moving element, that is, the flux density in the magnetic circuit, and controls the current in a solenoid based thereon. It provides a simple and efficient circuit for maintaining substantially constant flux density. It also provides a servo mechanism for controlling the position of the moving element based upon the electrical and magnetic characteristics of the actuator itself, with reference to a position input signal.

The magnetic flux density experienced by the moving element of the actuator is measured by the placement of a flux density sensor in the magnetic circuit of the actuator. An example of such a sensor is a Hall effect device. The output of the flux density sensor is fed to a control circuit for controlling the current in the solenoid to maintain substantially constant flux density and, hence, substantially constant force.

A "chopping" circuit is used to maintain the flux density substantially constant by controlling the duty cycle of the solenoid. In this manner external current is either connected or disconnected to the solenoid and energy losses in the control circuit components are minimized. A flyback diode connected in parallel with the solenoid permits current in the solenoid to recirculate when external current is turned off, thereby producing an exponential, rather than oscillatory, decay of the magnetic field in the solenoid, which tends to reduce energy losses and protects the control circuitry. Alternatively, analog control of the current in the coil may be provided in response to a flux density sensor.

The force exerted by the actuator may be adjusted by providing a magnetic field that biases the flux density sensor, or by amplifying the sensor signal. A biasing field may also be employed to achieve a desired force-displacement characteristic for the actuator.

The output of the flux density sensor may be divided into a signal representative of the measured current in the solenoid to produce a signal representative of the position of the moving element of the actuator. The position-representative signal may then be compared to an input control signal to adjust the force experienced by the moving element until it has travelled to a desired position.

Although the preferred embodiment of the invention, a variable reluctance linear actuator, employs a moving element experiencing essentially constant flux distribution, the invention can be adapted to devices whose moving element experiences changing flux distribution of a predictable, or empirically measureable, character. Such devices may be used, for example, to create rotational motion.

Therefore, it is a principal object of the present invention to provide a novel controlled force variable reluctance actuator.

It is another object of the present invention to provide a variable reluctance actuator wherein current in a magnetic field-generating coil of the actuator is controlled in response to measurement of magnetic circuit flux density.

It is another object of the present invention to provide a variable reluctance actuator wherein the force experienced by the moving element thereof may be selectively controlled.

It is yet another object to provide a variable reluctance actuator which employs a high energy efficiency control circuit.

It is a further object of the invention to provide a variable reluctance actuator in which the relationship between the force experienced by the moving element and the position of the moving element may be selectively controlled.

It is yet a further object of the present invention to provide a variable reluctance actuator wherein the position of the actuator may be controlled without the use of external position transducers.

It is an object of the present invention to provide a simple, constant force variable reluctance linear actuator.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 shows an exemplary curve representing the force-displacement relationship of the moving element of an open loop variable reluctance linear actuator operated at constant current.

FIG. 2*a* shows a side, cross-sectional representation of a preferred embodiment of a variable reluctance linear actuator according to the present invention.

FIG. 2*b* shows a cross-sectional view of the actuator of FIG. 2*a*, taken along line 2*b*—2*b* thereof.

FIG. 3 shows a schematic diagram of a control circuit for the actuator of FIG. 2*a*.

FIG. 5*a* shows a schematic diagram of an alternative embodiment of the actuator of FIG. 2*a* wherein the level of constant force may be adjusted.

FIG. 5*c* shows a schematic diagram of an alternative embodiment of the actuator of FIG. 2*a* wherein mechanical force is controlled by an analog signal.

DETAILED DESCRIPTION OF THE INVENTION

Figure 5B:
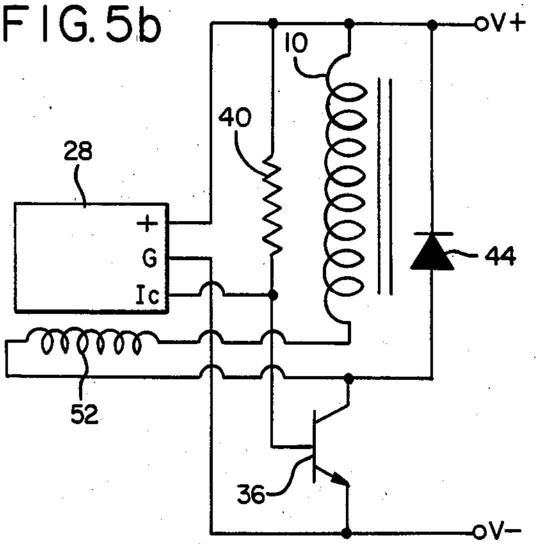
FIG. 5*b* shows an alternative embodiment of the actuator of FIG. 2*a* wherein the force-displacement curve is modified to provide a predetermined linear relationship between force and displacement.

As shown in FIG. 1, the mechanical force $f_m$ experienced by the moving element of a variable reluctance actuator as a result of the magnetic field generated by a coil to which a constant current is supplied ordinarily changes in a non-linear manner as a function of displacement x of that element, the force decreasing with increasing displacement in the direction of increasing reluctance. In that case, it necessarily follows that the magnetic flux density B experienced by that element varies as well, since the force is proportional to the square of the flux density. However, since the flux density can be controlled by controlling the current applied to the actuator, the force can likewise be controlled by controlling that current.

The mechanical structure and magnetic circuit of a preferred embodiment of a controlled force variable reluctance actuator can be understood with reference to FIGS. *2a* and *2b*. As shown in FIG. *2a*, the actuator employs a solenoid 10 wound on a form 12, preferably a spool, which may serve not only to provide the solenoid with shape but as a bearing for the moving element 14 of the actuator. The moving element, or actuation means, 14 is made of a material classified as "ferromagnetic", for example, iron. In an actuator such as that shown in FIG. *2a*, commonly known as a linear actuator, the moving element is commonly referred to as a plunger.

The form 12 would typically be made of some type of plastic material, such as nylon or polycarbonate material. The moving element 14, when placed within the solenoid as shown, will experience a magnetic flux density generally along its longitudinal axis thereby producing a mechanical force tending to pull the moving element into the core of the solenoid.

In order to increase the efficiency of the actuator, it is provided with a hat-shaped first end cap 16, which also serves as a stop for the plunger, a casing 18, and a disc-shaped second end cap 20, all of which preferably comprise ferromagnetic materials. The first end cap 16 is slightly separated from the casing 18 by a disc-shaped spacer 22 in order to provide a location for a magnetic flux density sensor. The space between the first end cap 16 and the moving element 14 comprises a variable reluctance air gap 24 and accounts for the majority of the reluctance in the magnetic circuit. The two end caps 16 and 20, the casing 18, the moving element 14, the spacer 22, and the air gap 24 provide a magnetic circuit to which the magnetic flux created by the solenoid is essentially confined.

It is to be recognized that the end caps, casing, and plunger might be made of other than ferromagnetic materials without departing from the principles of the invention. The end caps and casing might not even be made of magnetic material, though the actuator would consequently be less efficient. The spacer 22 is preferably made of a non-magnetic material; although this introduces some additional reluctance into the magnetic circuit, it serves to ensure symmetrical flux distribution.

A magnetic flux density sensor, or measurement means, 26 is disposed between the first end cap 16 and the casing 18. Preferably the sensor comprises a Hall effect device, such as a Hall effect switch or analog semiconductor. Hall effect switches provide an "on" or "off" binary output based upon a threshhold level of magnetic field density. Analog Hall effect devices provide a variable analog output signal that is a function of the magnetic flux density. The nature and operation of such devices is commonly known in the art. Although a particular placement of the sensor 26 is shown, it is to be recognized that the device could be placed anywhere within the magnetic circuit of the actuator without departing from the principles of this invention. Moreover, other sensor devices, such as magnetoresistive devices (devices whose resistance varies with experienced flux density), which provide a signal representative of magnetic flux density might also be used without departing from the principles of this invention.

Since the force experienced by the moving element 14 as a result of the current in the solenoid is a function only of the magnetic flux density that it experiences, the magnetic flux density experienced by the sensor 26 provides a direct measurement of the mechanical force experienced by the moving element. Moreover, in the actuator shown, since the distribution of magnetic flux density experienced by the moving element 14 is constant, the magnetic flux density experienced by the sensor 26 is directly proportional to the flux density experienced by the moving element.

Turning to FIG. 3, a control circuit is provided for controlling the current in the solenoid based upon the output of the sensor 26. In this preferred embodiment of a control circuit the sensor 26 comprises a Hall effect switch 28 having a positive power supply input 30, a common, or negative, supply connection 32, and a binary output 34. When the magnetic flux density to which the switch 28 is exposed exceeds an operating point, defined by the characteristic of the switch, the binary output goes "low"; when the flux density decreases below a release point, the output goes "high." Since the operating point and release point differ from one another, the resultant hysteresis provides for unambiguous or non-oscillatory switching. An example of a suitable device is the UGN-3030T/U bipolar Hall effect digital switch manufactured by Sprague Electric Company, 70 Pembroke Rd, Concord, N. Hamp.

A control transistor 36 has its collector connected to the solenoid 10 and its emitter connected to the common, or negative, power connection 38, so as to be in series with the solenoid. The base of the transistor is biased on by a resistor 40 so that when the output of the Hall switch 28 is high, the transistor is switched on and current flows from the positive power connection 42 through the solenoid 10 to the negative supply 38; yet, when the output from the Hall switch goes low, it pulls the base voltage low and, hence, shuts the transistor 36 off so as to disconnect external current from the solenoid 10.

When external current to the solenoid 10 is cut off by the control transistor 36, the magnetic field in the solenoid will begin to collapse. A flyback diode 44 is provided so that the current generated in the solenoid by the collapsing magnetic field will recirculate through the coil causing the field to decay exponentially, at a rate determined essentially by the inductance and resistance of the solenoid. In the absence of the diode the field would decay in an oscillatory manner, due to the distributed capacitance of the solenoid, which would create eddy current losses in the magnetic circuit, as well as produce voltage spikes that could damage the transistor. Thus, as a result of the flyback diode 44 the magnetic field tends to remain more nearly constant. To achieve this result the flyback diode 44 must be connected in opposite polarity to the external power applied to the solenoid.

Figure 4:
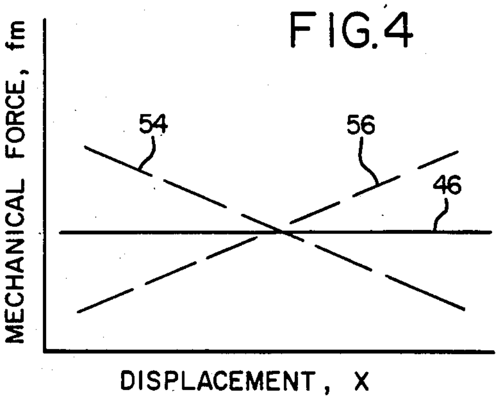
FIG. 4 shows force-displacement curves for various embodiments of variable reluctance actuators according to the present invention.

As the magnetic field in the solenoid begins to collapse, the magnetic flux density experienced by the Hall effect switch drops. As soon as it drops below the release point, the transistor is turned on again, thereby supplying current to the solenoid and reestablishing the magnetic field. The circuit thus turns on and off so as to maintain the magnetic flux density in the magnetic circuit essentially constant; hence, the force experienced by the moving element 14 is also maintained essentially constant. In actuality, the flux varies slightly with a periodicity dependent upon the characteristic hysteresis of the Hall switch 28 and the time constants in the control circuit, which establish the duty cycle of the solenoid. A change in position of the moving element causes the transistor to turn on or off for different periods of time, that is, it changes the duty cycle. The result of this control circuit is that the force remains essentially constant regardless of displacement of the moving element, as shown by curve 46 in FIG. 4. Also, since the transistor is operating in a switching mode, it dissipates very little energy and the circuit operates very efficiently.

Turning to FIG. 5*a*, an alternative embodiment employs a modification of the control circuit of FIG. 3 wherein a second coil 48 is magnetically coupled to the Hall switch 28 so as to bias the level of magnetic flux that the Hall switch experiences. By varying the current in the second coil 48 using, for example, a potentiometer 50, the force experienced by the moving element 14, though constant, can be adjusted selectively.

In FIG. 5*b* another modification of the control circuit of FIG. 3 employs a third coil 52 connected in series with the solenoid 10 and magnetically coupled to the Hall switch 28. This coil can be used to provide the actuator With a characteristic whereby the mechanical force experienced by the moving element has a substantially linear relationship to displacement. Where the third coil 52 is coupled to the Hall switch 28 so as to add to the magnetic flux the mechanical force will be inversely proportional to the displacement, as shown by curve 54 in FIG. 4; whereas, if the third coil 52 is coupled so as to substract from the magnetic flux, the mechanical force will be directly proportional to displacement as shown by curve 56 of FIG. 4.

Turning to FIG. 5*c*, an analog version of a control circuit employs a Hall device 58 having an analog, rather than a binary, output 60 which drives a control transistor 62 biased by a resistor 64 and connected in series with the solenoid 10. (It is assumed that the Hall device 58 is actually an analog circuit incorporating a Hall effect sensor and that the output provides negative feedback to transistor 62.) The amount of current allowed to flow through the solenoid 10 is thus proportional to the output of the Hall device. Since the solenoid 10 is not simply turned on and off a flyback diode is unnecessary. Such an embodiment would exhibit less energy efficiency, but can be used in applications where the slight oscillation associated with the control circuit of FIG. 3 is undesirable.

Figure 6:
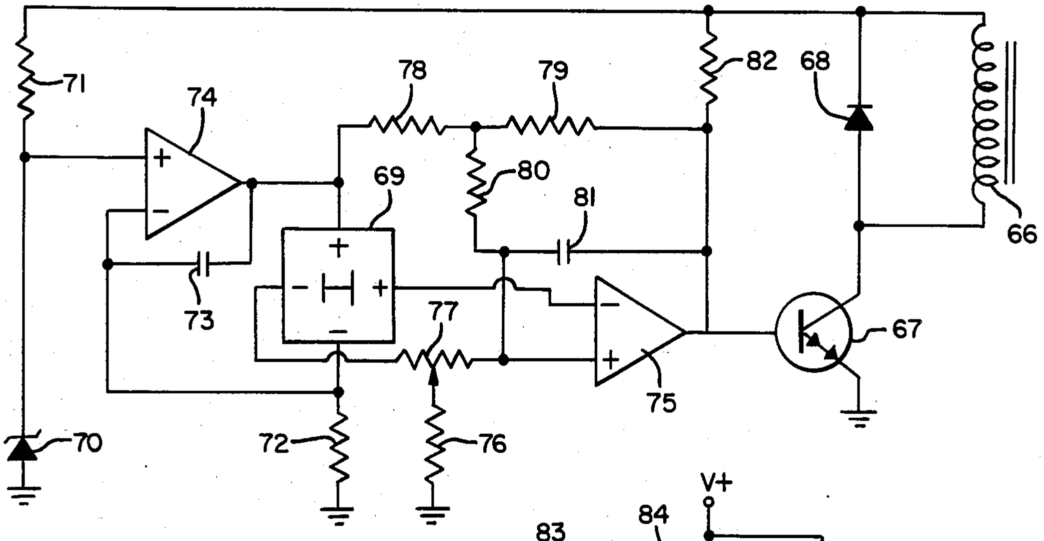
FIG. 6 shows a schematic diagram of another alternative adjustable force control circuit for an actuator according to the present invention.

FIG. 6 shows yet another embodiment of an actual control circuit employed to selectively provide constant force in a variable reluctance actuator without the addition of another coil. In the circuit the actuator solenoid 66 is controlled by a Darlington pair transistor device 67. A flyback diode 68 is provided, since the solenoid is controlled in a switching mode. An analog Hall device 69 is employed in this circuit. A suitable device would be, for example, the THS 102A Hall effect sensor manufactured by Toshiba America, Inc., 2441 Michelle Dr., Tustin, Calif. Constant current input is provided to the Hall device by zener diode 70, resistors 71 and 72, capacitor 73, and amplifier 74. The output from the Hall device 69 is amplified by amplifier 75, whose output is connected to the input of the Darlington device 67. The gain of the amplifier's output is controlled by fixed resistor 76 and variable resistor 77, thereby setting the median level to which the Darlington device 67 responds. A hysteresis function is employed so as to switch the transistor on or off in an unambiguous manner. The hysteresis function is provided by resistors 78, 79 and 80, and capacitor 81. Resistor 82 provides biasing for the Darlington device 67. This circuit is simply exemplary, and the manner of design and construction of this, or a similar, circuit would be commonly known to a person skilled in the art.

Figure 7:
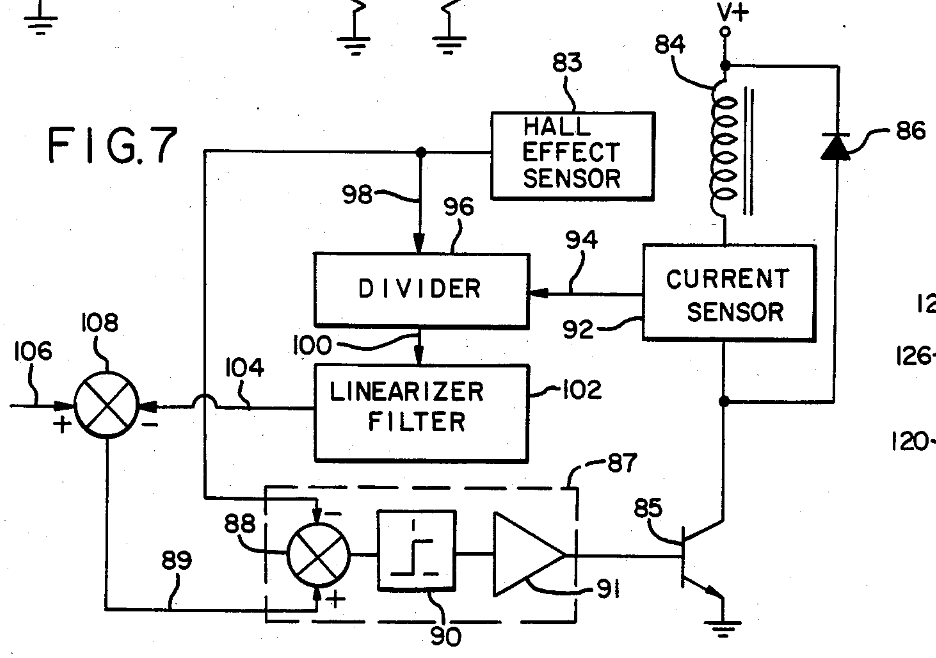
FIG. 7 shows a block diagram of an alternative variable reluctance actuator servo control circuit according the present invention, including a position adjustment feature.

A control circuit for an embodiment of the invention that includes position control is shown in FIG. 7. Although contemplated for use with a linear actuator such a that shown in FIG. 2*a*, the control circuit could also be used with actuators having other geometric characteristics. This control circuit is similar to the previously discussed control circuits in that it includes a Hall effect sensor 83 magnetically coupled to the magnetic circuit of the actuator solenoid 84, which is operated in an on-off mode by a switching transistor 85. A flyback diode 86 is included to recirculate current generated by collapse of the field in the solenoid. The transistor 85 is turned on and off by a switch controller circuit 87, which includes a summing junction 88, such as a differential amplifier, for adjusting the output of the Hall effect sensor 83 up or down, based upon an error signal input 89, a hysteresis circuit 90 for ensuring that the output to the transistor 85 either turns the transistor on or off, for maximum efficiency, and an amplifier 91, associated with the hysteresis circuit 90 for providing any needed gain for operating the transistor. It is to be recognized that this is a functional description and that a variety of different specific circuits for providing the features of the switch controller 87 could be designed by a person skilled in the art.

The error signal 89 is employed to vary the force on the moving element so as to move it to and maintain it at a selected position. In a linear actuator of the type shown by FIG. 2*a* the circuit permeance p is a substantially linear inverse function of position x. The position may be described by the following equation:

$$x=k(i/B)$$

where x=position k=a constant, and i=the current in the solenoid.

Consequently, by dividing the output from the Hall effect sensor, which is proportional to the flux density B, into the value of the current in the solenoid 84, a signal representative of position may be generated.

The control circuit is provided with a current sensor 92 whose output 94 is a signal representative of current in the solenoid and a divider 96 that divides the output 98 from the Hall effect sensor into the output 94 from the current sensor to produce a position signal output 100. Although the position signal output 100 is very nearly directly proportional to the position of the moving member in a linear actuator, slightly non-linear characteristics may exist due to the geometry of the device. Accordingly, a practical control circuit may include a circuit for compensating for non-linearity, such as linearizer filter 102. Its output signal 104 is a linearized representation of moving element position. The signal 104 is compared to a position input signal 106 by a summing junction 108, such as differential amplifier, to produce as a result the error signal 89. When the linearized position signal 104 differs from the position input signal 106,the error signal 89 takes on a non-zero value causing the force experienced by the moving member to change until the moving member has relocated to the desired position, at which point the error signal would take on a zero, or equivalent, value.

Figure 8:
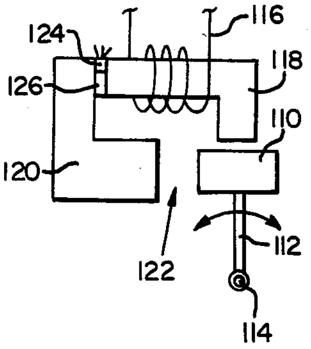
FIG. 8 shows an alternative embodiment of a variable reluctance actuator according to the present invention wherein the actuator produces rotational motion and the moving element experiences variable flux distribution.

The mechanical portion of the control force actuator may take on other than a linear configuration. Moreover, the moving element need not necessarily move within the core of the solenoid. For example, in FIG. 8, the moving element is a ferromagnetic head 110 attached by an arm 112 to a pivot 114 so as to produce rotational motion. It is coupled to a solenoid 116 by a ferromagnetic circuit having two parts 118 and 120, respectively, the former providing the core for the solenoid 116, and an air gap 122. A flux density sensor 124 is placed in the magnetic circuit path in a manner similar to the device of FIG. *2a,* a spacer 126 providing the location for the sensor. Of course, a slight additional air gap would be formed between the head 110 and the magnetic circuit part 118, though the majority of the variable reluctance would result from the variance in the dimension of the air gap 122.

In such an alternative, which is merely exemplary of a variety of different alternatives that would fall within the scope of this invention, the cross-sectional distribution of magnetic flux experienced by the moving element, that is, ferromagnetic head 110, changes with position. Consequently, the flux density measured by the sensor 124 is not directly proportional to the flux density experienced by the moving element 110. Nevertheless, the change of flux distribution with position can be analytically predicted and compensated for in the control circuit.

The terms and expressions which have been employed in the foregoing speification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A variable reluctance actuator, comprising:

(a) coil means for producing a magnetic field in response to an electrical current therein;

(b) actuator means for forming a magnetic circuit with said coil means, at least two portions of said actuator means comprising magnetic material and being mounted for movement relative to each other so that the reluctance of said magnetic circuit is variable in response to said movement;

(c) control means for varying the magnitude of said electrical current in said coil means; and (d) position sensing circuit means for producing a position signal representative of the relative position of said two portions of said actuator means throughout a range of movement relative to each other, said position sensing circuit means including first sensor means responsive to the magnitude of the flux density of said magnetic field at a location in said magnetic circuit, and seocnd sensor means separate from said first sensor means and responsive to the magnitude of said electrical current in said coil means for producing a current magnitude signal representative of the magnitude of said electrical current and proportional to changes therein throughout said range of movement and throughout any changes in the magnitude of said electrical current.

2. The actuator of claim 1 wherein said position sensing circuit means comprises means for producing a signal representative of the mathematical ratio between the magnitude of said electrical current in said coil means as represented by said current magnitude signal and the magnitude of said flux density.

3. The actuator of claim 1 wherein said control means includes positioning means for controlling said relative position by varying the magnitude of said electrical current in said coil means and thereby changing the magnitude of said flux density in response to said position signal, so as to change said relative position.

4. A variable reluctance actuator, comprising:

(a) coil means for producing a magnetic field in response to an electrical current therein;

(b) diode means connected to said coil means for conducting electrical current in said coil means generated by any reduction of said magnetic field;

(c) actuator means for forming a magnetic circuit with said coil means, at least two portions of said actuator means comprising magnetic material and being mounted for movement relative to each other so that the reluctance of said magnetic circuit is variable in response to said movement;

(d) control means for varying the magnitude of said electrical current in said coil means; and (e) position sensing circuit means for producing a position signal representative of the relative position of said two portions of said actuator means throughout a range of movement relative to each other, said position sensing circuit means including first sensor means responsive to the magnitude of the flux density of said magnetic field at a location in said magnetic circuit, and second sensor means separate from said first sensor means and responsive to the magnitude of said electrical current in said coil means for producing a current magnitude signal representative of the magnitude of said electrical current, including the electrical current conducted by said diode means during any reduction of said magnetic field, and proportional to changes in said electrical current throughout said range of movement and throughout any changes in the magnitude of said electrical current.

5. The actuator of claim 4 wherein said position sensing circuit means comprises means for producing a signal representative of the mathematical ratio between the magnitude of said electrical current in said coil means as represented by said current magnitude signal and the magnitude of said flux density.

6. The actuator of claim 4 wherein said control means includes positioning means for controlling said relative position by varying the magnitude of said electrical current in said coil means and thereby changing the magnitude of said flux density in response to said position signal, so as to change said relative position.

* * * * *

UNITED STATES PATENT AND TRADEMARK OFFICE

CERTIFICATE OF CORRECTION

PATENT NO. : 4,659,969

DATED : April 21, 1987

INVENTOR(S) : Joseph J. Stupak, Jr.

It is certified that error appears in the above-identified patent and that said Letters Patent is hereby corrected as shown below:

Col. 7, line 27, Change "With" to --with--.

Col. 9, line 62, Change "seocnd" to --second--.

Signed and Sealed this

Twentieth Day of October, 1987

*Attest:*

DONALD J. QUIGG

*Attesting Officer* *Commissioner of Patents and Trademarks*